(12) United States Patent
Uchida et al.

(10) Patent No.: US 8,269,797 B2
(45) Date of Patent: Sep. 18, 2012

(54) APPROPRIATELY SCALED MAP DISPLAY WITH SUPERPOSED INFORMATION

(75) Inventors: Yuki Uchida, West Caldwell, NJ (US); Yuichi Takamiya, Fort Lee, NJ (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 700 days.

(21) Appl. No.: 12/534,370

(22) Filed: Aug. 3, 2009

(65) Prior Publication Data
US 2011/0025715 A1  Feb. 3, 2011

(51) Int. Cl.
G09G 5/00 (2006.01)
G01C 21/00 (2006.01)
(52) U.S. Cl. ..................... 345/668; 701/455
(58) Field of Classification Search .............. 345/668; 701/455
See application file for complete search history.

(56) References Cited

U.S. PATENT DOCUMENTS

| | | | |
|---|---|---|---|
| 5,506,644 A | 4/1996 | Suzuki et al. | |
| 5,850,618 A * | 12/1998 | Suetsugu et al. | 701/428 |
| 5,913,078 A | 6/1999 | Kimura et al. | |
| 6,160,964 A | 12/2000 | Imoto | |
| 6,336,073 B1 * | 1/2002 | Ihara et al. | 701/533 |
| 6,424,355 B2 * | 7/2002 | Watanabe et al. | 345/668 |
| 6,424,933 B1 * | 7/2002 | Agrawala et al. | 703/2 |
| 6,999,112 B2 | 2/2006 | Seaman et al. | |
| 7,145,597 B1 | 12/2006 | Kinjo | |
| 7,158,878 B2 | 1/2007 | Rasmussen et al. | |
| 7,242,791 B2 | 7/2007 | Han et al. | |
| 7,373,246 B2 | 5/2008 | O'Clair | |
| 7,379,811 B2 | 5/2008 | Rasmussen et al. | |
| 7,474,317 B2 * | 1/2009 | Dolph et al. | 345/629 |
| 7,539,411 B2 | 5/2009 | Uchiyama et al. | |
| 7,925,430 B2 * | 4/2011 | Nesbitt | 701/455 |
| 7,948,502 B2 * | 5/2011 | Stanton | 345/629 |
| 2002/0191087 A1 | 12/2002 | Hashimoto et al. | |
| 2003/0081126 A1 | 5/2003 | Seaman et al. | |
| 2003/0185549 A1 | 10/2003 | Partynski et al. | |
| 2004/0174434 A1 | 9/2004 | Walker et al. | |
| 2006/0110154 A1 | 5/2006 | Hulsen et al. | |
| 2007/0200862 A1 | 8/2007 | Uchiyama et al. | |

OTHER PUBLICATIONS

"The Ricoh 500SE GPS-ready Digital Camera" brochure (2 pages); available at http://www.ricoh-usa.com/solutions/geoimaging/brochures/500SE_brochure_final.pdf.

* cited by examiner

Primary Examiner — Ryan R Yang
(74) Attorney, Agent, or Firm — Cooper & Dunham LLP

(57) ABSTRACT

Methods, apparatuses and systems are provided for determining an appropriate scaling of a map display or providing an appropriately scaled map display.

20 Claims, 17 Drawing Sheets

| Name | Size | Type | Date Modified | Date Picture Taken | Dimensions |
|---|---|---|---|---|---|
| RIMG0325.JPG | 681 KB | JPEG Image | 2008/10/09 21:31 | 2008/10/09 7:37 | 1280 x 960 |
| RIMG0326.JPG | 649 KB | JPEG Image | 2008/10/09 21:31 | 2008/10/09 7:37 | 1280 x 960 |
| RIMG0327.JPG | 729 KB | JPEG Image | 2008/10/09 21:31 | 2008/10/09 7:37 | 1280 x 960 |
| RIMG0328.JPG | 677 KB | JPEG Image | 2008/10/09 21:31 | 2008/10/09 7:38 | 1280 x 960 |
| RIMG0329.JPG | 696 KB | JPEG Image | 2008/10/09 21:31 | 2008/10/09 7:38 | 1280 x 960 |

Fig. 6A

| # | Name | Size | Type | Date Modified | Date Picture Taken | Dimensions | Longitude, Latitude |
|---|---|---|---|---|---|---|---|
| 1 | RIMG0325 | 681 KB | JPEG Image | 2008/10/09 21:31 | 2008/10/09 7:37 | 1280 x 960 | X1, Y1 |
| 2 | RIMG0326 | 649 KB | JPEG Image | 2008/10/09 21:31 | 2008/10/09 7:37 | 1280 x 960 | X2, Y2 |
| 3 | RIMG0327 | 729 KB | JPEG Image | 2008/10/09 21:31 | 2008/10/09 7:37 | 1280 x 960 | |
| 4 | RIMG0328 | 677 KB | JPEG Image | 2008/10/09 21:31 | 2008/10/09 7:38 | 1280 x 960 | |
| 5 | RIMG0329 | 696 KB | JPEG Image | 2008/10/09 21:31 | 2008/10/09 7:38 | 1280 x 960 | X3, Y3 |

Fig. 6B

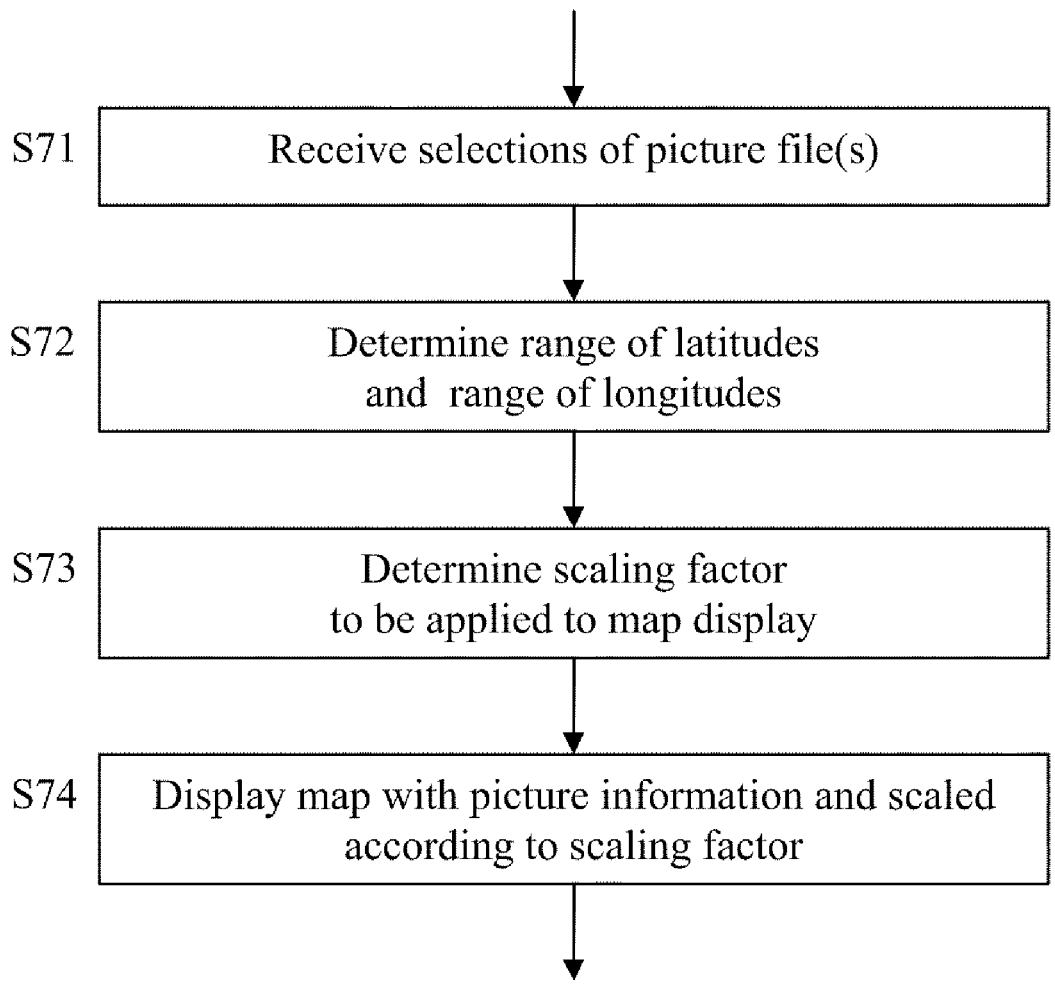

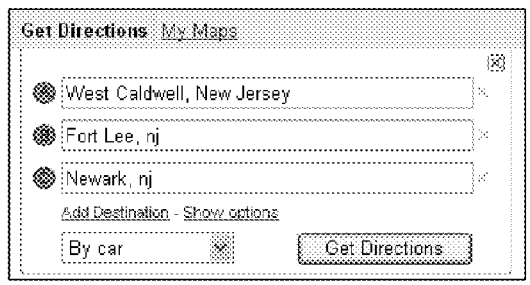
Fig. 10
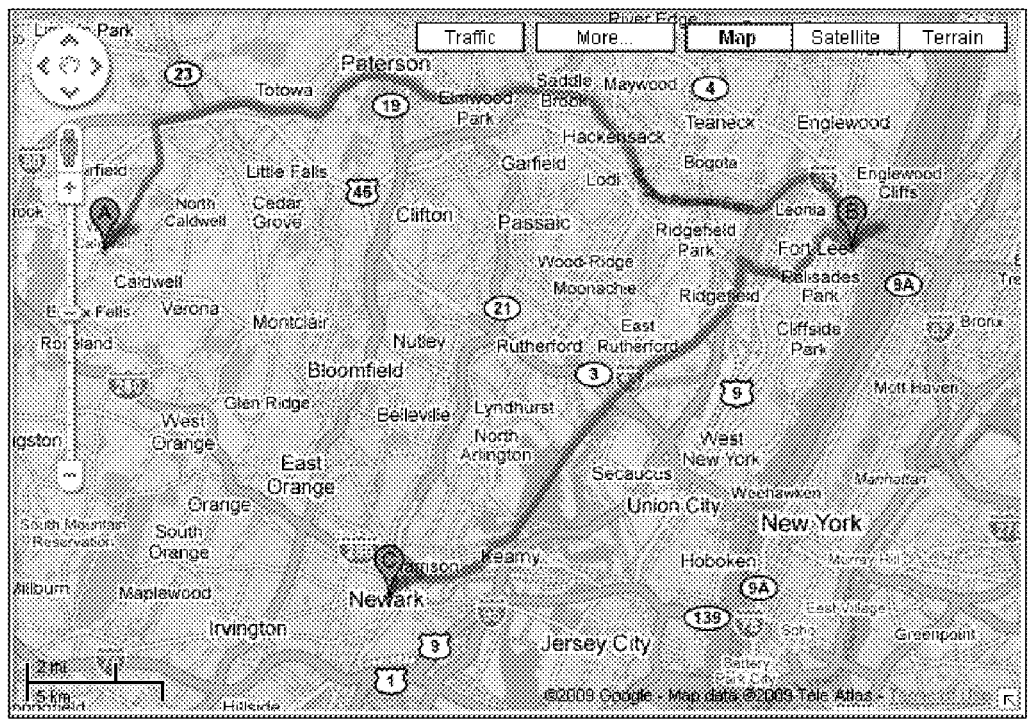

APPROPRIATELY SCALED MAP DISPLAY WITH SUPERPOSED INFORMATION

TECHNICAL FIELD

This disclosure relates to utilizing map displays to present information items that are associated with corresponding geographical locations. In particular, the disclosure relates to methods, apparatuses and systems wherein an appropriately scaled map display is provided along with indications of points thereon that are associated with the respective information items and that includes information content in addition to the location information.

BACKGROUND

With the proliferation of technology and travel in our lives, maps displayed on electronic displays are becoming a common tool in our lives, such as in connection with travel.

For example, the map application "Google Map" allows a user to specify locations of a travel itinerary, and in response to the entered locations, the application provides driving directions as well as a map display that includes the specified locations. Such map display also shows a graphical indication of the proposed route corresponding to the driving directions. Thus, the user can obtain a high level graphical view of the proposed route. An example of such a map display is shown in FIG. 10.

In addition, in the current era of mass consumption, map displays are commonly used to show consumers where they can acquire desired goods and/or services. Such examples of map display technology are proposed in U.S. Pat. Nos. 7,379,811 and 7,373,246, the entire disclosures of which are incorporated herein by reference in order to more fully describe the state of the art as known to those skilled therein as of the date of the invention described herein.

In addition, use of a geographical information system (GIS) for collecting location-associated information is becoming more common, such as in connection with surveys of land and other real estate, road repairs, fire and other disasters, etc. As such information is collected, location information, such as generated by a global positioning system (GPS) receiver, is associated with the collected information. Examples of such systems are proposed in commonly-owned U.S. Pat. No. 7,539,411, the entire contents of which are incorporated herein by reference.

Further, such a system may be coupled to a digital camera which is configured such that pictures captured by the digital camera at a survey site can be uploaded to the GIS and can be associated with other data stored in the GIS in connection with the survey site, to establish a relation between pictures taken by the digital camera and the location information stored in the GIS. Examples of such systems are proposed in U.S. Pat. Nos. 5,506,644, 5,913,078, 6,160,964, 6,999,112, 7,145,597 and 7,242,791 and U.S. patent application Publications Nos. US 2002/0191087 A1, US 2003/0081126 A1, US 2003/0185549 A1, US 2004/0174434 A1 and US 2006/0110154 A1, the entire disclosures of which are incorporated herein by reference in order to more fully describe the state of the art as known to those skilled therein as of the date of the invention described herein.

While a map display is typically an integral component of a GIS system, the map display in a conventional GIS system typically has a set scale that is predetermined or preset (for example, based on stored user settings). However, such a map display based on a predetermined or preset scale inevitably leads the user to perform multiple iterations of zoom in, zoom out, pan, etc., in order to obtain the map view desired by the user.

SUMMARY

In accordance with this disclosure, tools (in the form of systems, apparatuses and methods) can be provided that appropriately and automatically scale a map display according to extent of locations associated with respective selected information items. Such tools enable the map display to provide relevant information, when a plurality of items of interest associated with respective known locations are selected.

In an aspect of this disclosure, the selected items are pictures (that is, photographs, artist-generated sketches and renderings, other visual presentations, etc.) and for each specific picture associated with a corresponding geographical location, location information indicating such location is obtained and the picture is tagged with the location information. A scaling factor is determined based on an extent of the locations, as determined based on the location information of the specific pictures, and a map image is scaled according to the scaling factor.

In another aspect, thumbnails of respective pictures are overlaid on the map image, to indicate the locations associated with the respective pictures. For example, the thumbnails displayed on the map image may be reduced-scale images of the respective pictures. In addition, the thumbnails may be associated with hyperlinks to the respective pictures.

The various features and aspects may be included in any of various possible system configurations.

In one example, a terminal is provided with a map display device (for example, a display coupled with a user interface, such as a browser), a map retrieval part and a network communication part. Means is provided for receiving selection of a plurality of pictures (for example, a user interface, the network communication part, an application programming interface, that is, API, etc.). The selection of the pictures may be by user operation through a user interface, or may be an automated (software-implemented) process based on specification of a store or pool of pictures (and the extent determination is executed for all of the pictures in the store or pool that have associated location information). The terminal may have a picture storage device (for example, hard disk, removable storage medium, etc.) storing a plurality of pictures and storing for each specific picture, location information corresponding to a geographical location associated with the specific picture, and the automated process may be performed to, for example, all of the pictures on the medium, all of the pictures in a specific folder or subdirectory, selected pictures, etc. The map retrieval part determines an extent of the locations associated with the respective selected pictures, based on the location information of the selected pictures. A request from the map retrieval part is communicated by the network communication part through a network to a map data source (for example, a server and/or a map database), to retrieve map data (corresponding to such extent) from the map source device.

In another example, a server apparatus is configured with a network communication part to transmit an application including a location determining part, an extent determining part and a scale determining part through a network to a terminal, in response to a request from the terminal. When the application executes on the terminal, the location determining part determines for each specific one of a plurality of pictures, location information corresponding to a geographical location associated with the specific picture, the extent determining part determines an extent of the locations of the specific pictures, and the scale determining part determines a scaling factor based on the extent determined by the extent determining part, and the application causes map data to be retrieved from a map database (the retrieved map data corresponding to the extent determined by the extent determining part) and causes the map image based on the retrieved map data to be displayed on a display of the terminal.

In another exemplary system configuration, the map source device (for example, server) transmits a map application through the network to a requesting device (for example, a terminal), and the map application executing on the terminal allows the terminal to obtain the map data retrieved by the map retrieval part through the network from a map database (for example, provided by the server, or separately network-connected, or independent from the server).

In another example, the terminal is configured with a network communication part (and perhaps other means) to communicate a request through the network to the map source device and/or map database directly, without a server or middleware, and receive the map data from the map source device, in response to the request.

In another example, the apparatus for determining an appropriate map display is a standalone device including picture store, location determining part, extent determining part, scale determining part, map database and/or other map source device (configured to store data for a map, receive a request for data based on the extent determined by the extent determining part, and output the requested map data), and display part. Such standalone device may nevertheless be configured with a network communication part to receive data updates for updating picture data, map data, other data, etc., as well as software or firmware updates, through a network.

In another aspect, any of the above-mentioned apparatuses may further be configured with an image capture device or picture forming device, such as a digital camera, to capture pictures or other images, and at the time that the specific picture or image is formed by the picture forming device or image capture device, the location determining part determines a geographical location of the picture forming device and the specific picture is tagged with the location information. The location information can be included in metadata of the specific picture to tag the specific picture with the location information. Additionally or alternatively, the location information is stamped on the specific picture to tag the specific picture with the location information.

BRIEF DESCRIPTION OF THE DRAWINGS

The above-mentioned and other aspects, features and advantages can be more clearly understood from the following detailed description with reference to the accompanying drawings wherein:

FIG. 6A shows a listing of pictures with picture parameters;

FIG. 6B shows an attribute table maintained for selected picture, including metadata for the pictures, in accordance with an exemplary embodiment;

FIG. 7 shows a flow chart for a method for providing an appropriate map display, according to an exemplary embodiment of this disclosure;

FIG. 10 shows an example of a map display illustrating a route for a trip.

DETAILED DESCRIPTION

Figure 1A:
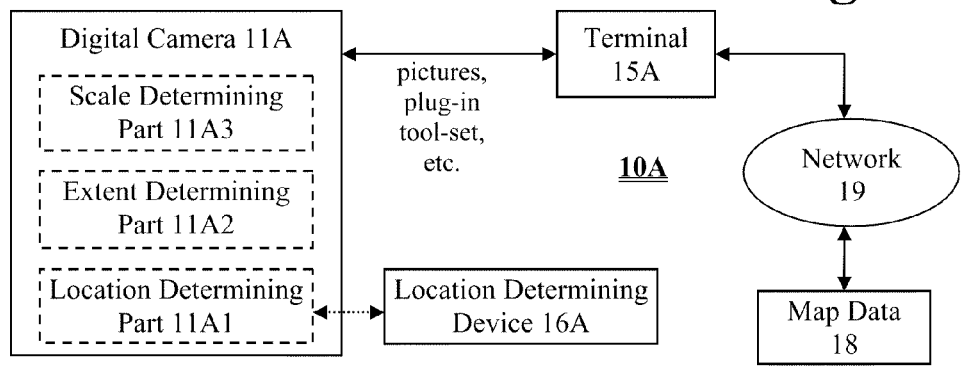
FIG. 1A shows a block diagram of a system for determining an appropriate map display, in accordance with an exemplary embodiment of this disclosure.

There are many instances in an information processing environment where items of information are associated with corresponding geographical locations, and one can quickly grasp the geographical distribution of items through an appropriate map display. This disclosure provides tools for determining an appropriate map display for a group of selected items. Such tools may be a computer program product and/or one or more computer programs stored in or on a program storage medium readable by a computer and embodying instructions executable by a computer or computer-like electronic device.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the inventive aspects of this disclosure.

Referring now to the drawings, wherein like reference numerals designate identical or corresponding parts throughout the several views, FIG. 1A shows schematically an example of a system wherein pictures (for example, photographs) are taken by a digital camera, as an imaging device, and each picture is associated (and tagged) with location information (when available) indicating a geographical location at which the picture was taken. It should be appreciated that the digital camera can be replaced by another electronic device, such as a portable or handheld terminal, smartphone, and the like, having a camera or imaging function.

System 10A illustrated in FIG. 1A includes an apparatus 11A, a terminal 15A, a location determining device 16, map database or data store, and a network 19.

The apparatus 11A is indicated in FIG. 1A to be a digital camera, but can be replaced by another electronic device having a camera function, and as discussed further infra, is configured, (as in many electronic devices) to include a processing unit and memory (as well as other storage devices) such that many functionalities can be provided through appropriate programming. For example, FIG. 1A shows that the apparatus 11A includes a location determining part 11A1, an extent determining part 11A2 and a scale determining part 11A3 which in combination allow an appropriately scaled map display to be provided.

The location determining part 11A1 in the example of FIG. 1A is configured to obtain for each specific picture, location information corresponding to a geographical location associated with the specific picture (although in some instances, location information is not available for that picture). Such location information may be received from, for example, the location determining device 16A which can be a global positioning system (GPS) receiver or another location determining device (such as using, for example, cellular, or other, triangulation techniques). On the other hand, the picture data in most instances in the system 10A includes the location information along with the image data. Further, the location information stored with the image data need not be the from the location determining device 12A, but rather can be user entered location data.

Figure 1B:
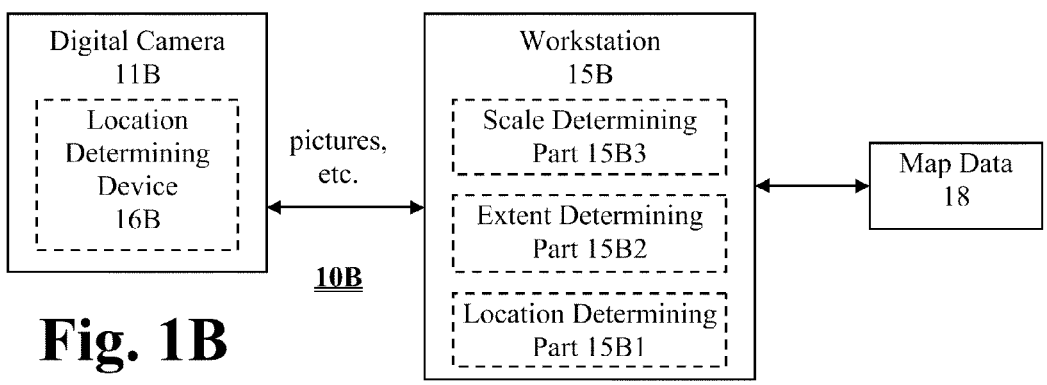
FIG. 1B shows a block diagram of a system for determining an appropriate map display, according to another exemplary embodiment.

In the system 10A shown in FIG. 1A, the location determining device 16A is shown to be external to the digital camera 11a. However, it should be appreciated that a location determining device comprised by a GPS receiver on a chip or a board can be integrated in a conventional manner in the digital camera (such as shown in FIG. 1B). Since the know-how to include both a camera function and a GPS receiver in a portable device is now well-known in the art, a detailed discussion of such input/output and communication is omitted in order to avoid masking the inventive aspects of this disclosure.

The extent determining part 111A2 is configured to determine an extent of the locations of the specific pictures, based on the location information of the specific pictures. The scale determining part 11A3 is configured to determine a scaling factor based on the extent of the locations determined by the extent determining part, and cause a map image to be scaled according to the scaling factor. Each of the location determining part, extent determining part and scale determining part can be a separate software part or a part of an integrated computer program (such as a plug-in, an application, etc.), and is discussed in more detail infra.

It should be appreciated that many other parts can be included in the apparatus 11A, that FIG. 1A merely shows an example, and that many variations are possible. For example, the apparatus 11A can be configured similarly to the apparatus shown in FIG. 2A. Further, although FIG. 1A may be construed to suggest that the map display is provided on the terminal 15A, the apparatus 11A can be configured to provide a map display natively, assuming the apparatus 11A includes a display unit that makes a map display thereon of practical use to the user. In such instances, it would be preferable that the apparatus 11A include ample memory or storage to store map data.

Figure 2A:
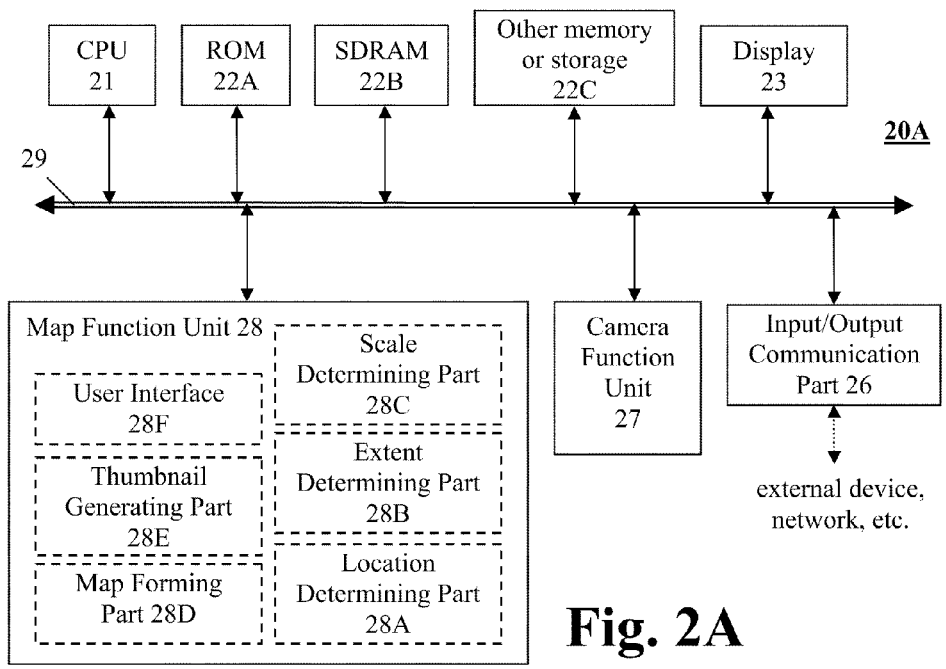
FIG. 2A shows a block diagram of an apparatus, such as in a digital camera, having a camera function and configured to provide an appropriate map display, according to another exemplary embodiment.

Apparatus 20A shown in FIG. 2A includes CPU (central processing unit) 21, ROM (read only memory) 21A, SDRAM (synchronous dynamic random access memory) 22B, other memory or storage 22C, display 23, camera function unit 27, internal bus 29, that operate like similar components in the digital camera shown in FIG. 2 of commonly-owned U.S. Pat. No. 7,539,411, the entire contents of which are incorporated herein by reference.

For example, the camera function unit 27 can operate essentially like the digital camera function unit shown in FIG. 2 of commonly-owned U.S. Pat. No. 7,539,411. Thus, the picture data for each picture captured by the apparatus 20A can include an Exif header portion in addition to the image data. The Exif header is a portion of the picture data that is typically used to store parameters that the camera used when capturing and storing the image data, such as aperture, compression, shutter speed, time captured, time stored, file size, display resolution, etc. Thus, the Exif header can store location information indicating, for example, the geographical location or coordinates (e.g., latitude and longitude, x and y, etc.) at which the picture was captured. Such picture data, including the location information in the Exif header, can be appropriately stored by the camera function unit 27 in, for example, the SDRAM 22B.

Similarly, the digital camera 11A in the system 10A of FIG. 1A can store picture data, including the location information in the Exif header, when the picture is captured, and at a time when a map display is to be provided, the location determining part obtains, for each selected picture, location information for the selected picture from the Exif header of the picture data.

In addition, the apparatus 20A shown in FIG. 2A includes a communication part 26 that allows the apparatus 20A to conduct input/output (such as a microphone, keypad, USB port, Bluetooth communication, etc.) or communicate through a network [for example, a conventional LAN (local area network), wireless LAN (WLAN), such as via WiFi communication, other wired or wireless network communication, such as WiMax, etc.] with an external device. How electronic devices can perform input/output and can connect to and communicate over a network is well-known in the art and therefore in the interest of brevity and clarity, a detailed discussion of such input/output and communication is omitted. Instead, the reader is referred to, for example, "How Computers Work", by Ron White, (Que Corporation 1999) and "How Networks Work", by Frank J. Derfler, Jr. and Les Freed (Que Corporation 2000), the entire contents of each of which are incorporated herein by reference.

Further, a map function unit 28 is provided in the apparatus 20A shown in FIG. 2A and includes various parts that allow an appropriate map display to be provided on the display unit 23 of the apparatus 20A and/or on another display unit (for example, on an external device). Such parts include a location determining part 28A, an extent determining part 28B and a scale determining part 28C (similar to the location determining part 12A, extent determining part 13A and scale determining part 14A, respectively), in addition to a map forming part 28D, a thumbnail generating part 28E and a user interface 28F.

The map forming part 28D is configured to retrieve map data (from a resident or external map database or data store, not shown) and supply the required signals to the display unit 23 and/or external display unit in order to provide, in a conventional manner, a map display thereon. However, the scaling of the map display is different than the conventional map display. In conventional approaches, the scaling of the map display is based on a default scaling value or a preset value (by user, at factory, or otherwise). On the other hand, by operation of the location determining part, extent determining part, scale determining part and map forming part, the apparatus 20A causes the map display to be automatically and appropriately scaled according to the scaling factor determined by the scale determining part.

Another aspect different from the conventional map display is that the thumbnail generating part 28E is configured to convert, for each of the pictures, the picture to a corresponding thumbnail (that is, corresponding to a reduced-scale image of the picture), and by operation of the map forming part and thumbnail generating part, the thumbnails are overlaid on the map image to indicate the locations associated with the respective pictures.

Returning to the system shown in FIG. 1A, when the apparatus 11A (via an input/output or communication part) is connected to the terminal 15A, such as, for example, through a USB (Universal Serial Bus) port or another serial or parallel port of the terminal, or by wireless communication, such as utilizing Bluetooth protocol, the apparatus 11A makes pictures, a plug-in tool-set, etc., available to the terminal 15A. As mentioned supra, the plug-in tool-set can include many software parts, such as the location determining part, extent determining part and scale determining part, as well as other software parts. For example, upon connection of the apparatus 11A to the terminal 15A, the user can be provided with a user interface (such as a browser window) on the terminal by which the user can select any or all pictures that are then-stored in the apparatus 11A, for upload from the apparatus 11A to the terminal 15A.

In addition, as further discussed infra, after the pictures are selected, a map display can automatically be provided on the terminal 15A, by default (which the user can decline by appropriate setting), with indications of points on the map associated with respective ones of the pictures (such as by operation of a map forming part, e.g., 28D in FIG. 2A, that can also be included in the plug-in tool-set). In the example of FIG. 1A, the map data is maintained in a map database or data store external to the terminal 15A.

Further, the plug-in tool-set provided to the terminal 15A can also include a thumbnail generating part (e.g., 28E in FIG. 2A) which generates, for each selected picture, a thumbnail image based on the picture and the thumbnail can be superposed on the map (or shown as a pop-up when the cursor is controlled to hover over the corresponding point on the map).

Figure 3A:
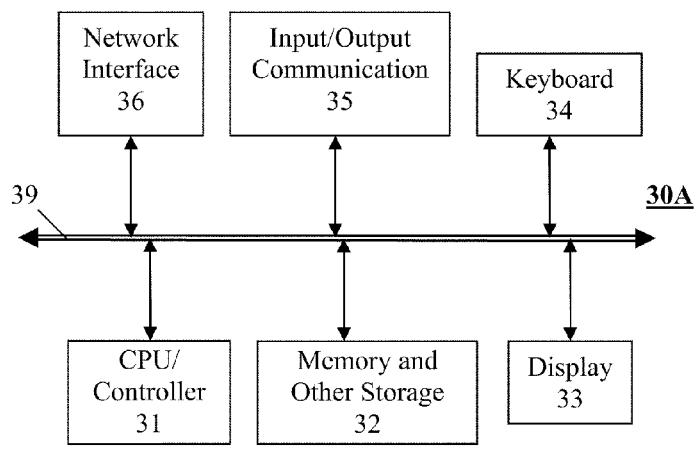
FIG. 3A shows a block diagram of an example of a computing device which can be used as the terminal in any of the systems shown in FIGS. 1A and 1D through 1G.

FIG. 3A shows a block diagram for a typical computing device that can be utilized as the terminal 15A in FIG. 1A.

In FIG. 3A, computing device 30 includes a controller or central processing unit (CPU) 31 that communicates by way of internal bus 39 with a number of other components, including memory and/or other storage device(s) 32, display 33, keyboard (and/or keypad) 34, other input/output (such as mouse, touchpad, serial or parallel ports, etc.) 35 and network interface 36.

The memory and/or other storage device(s) 32 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), synchronous dynamic random access memory (SDRAM), non-volatile random access memory (NOVRAM), etc.].

The network interface 36 provides a connection (for example, by way of an Ethernet connection or other network connection which supports any desired protocol such as, but not limited to, TCP/IP, IPX, IPX/SPX, NetBEUI, WiFi, WiMax, etc.) to a network (wired or wireless, such as any of an intranet, extranet, local area network, wide area network, or the like, or a combination thereof), in a conventional manner.

The controller 31 executing program code instructions (stored in memory 32 or other conventional storage devices) controls operations of the computing device 30, including providing various functionalities discussed herein (such as by a location determining part, an extent determining part, a scale determining part, a map forming part, a thumbnail generating part, etc.).

Further, pictures and map data can be stored in local storage device 32, or in an external or network-connected device (for example, 17 in FIGS. 1C through 1G, and 18 in FIGS. 1A through 1G), and retrieved from such storage device, for processing by the document reading part.

Additional aspects or components of the computing device 30 are conventional (unless otherwise discussed herein), and in the interest of clarity and brevity are not discussed in detail herein.

As should be appreciated, the computing device 30 can be any electronic device having adequate processing resources, including but not limited to a personal, notebook, workstation or server computer, a kiosk, a PDA (personal digital assistant), a mobile or smart phone or handset, another information terminal, etc. The device is preferably configured to communicate with other devices through input/output ports and/or a network.

Thus, in the system 10A of FIG. 1A, for example, the terminal 15A can retrieve map data through network 19 from a data store or database 18.

It should be appreciated that the system of FIG. 1A is exemplary, and that many variations are possible.

For example, FIG. 1B shows a system in which workstation 15B communicates with camera apparatus 11B which operates as a picture source. Like the example of FIG. 1A, upon connection between the workstation 15B and the camera apparatus 11B, pictures, including image data along with location information (for example, obtained by location determining device 16B resident in the camera apparatus 11B), can be uploaded from the apparatus 11B to the workstation 15B. A plug-in tool set can optionally be provided to provide functionalities specific to the pictures. However, location determining part 15B1, an extent determining part 15B2 and a scale determining part 15B3 (which have functionalities similar to location determining part 11A1, an extent determining part 11A2 and a scale determining part 11A3, respectively) are native to the workstation 15B, and are not communicated from the camera apparatus 11B to the workstation 15B.

Figure 2B:
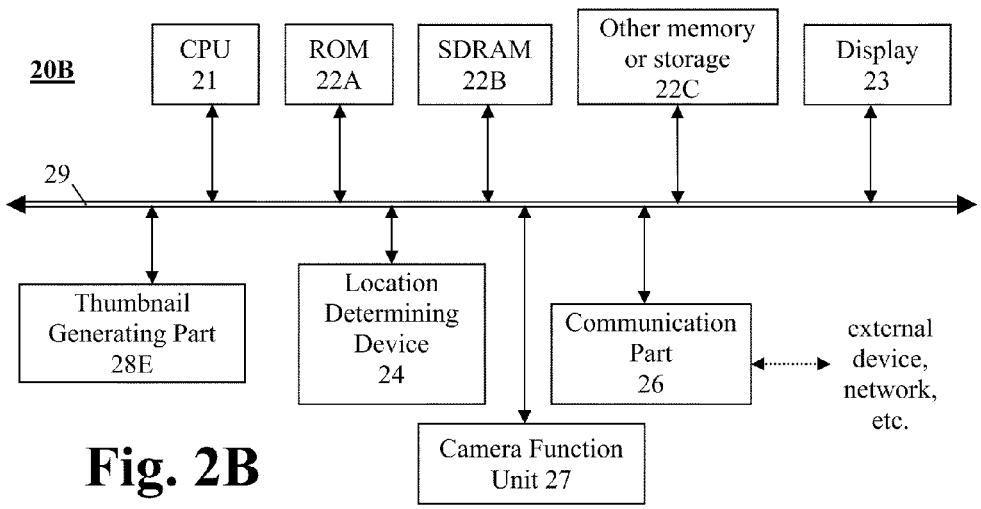
FIG. 2B shows a block diagram of an apparatus having a camera function, in accordance with another exemplary embodiment.

The camera apparatus 11B can be configured similarly to apparatus 20B shown in FIG. 2B. The apparatus 20B can include the thumbnail generating part 28E, like in the apparatus 20A shown in FIG. 2A, but does not include the other parts of the map function unit in the apparatus 20A. However, other software parts and other functionalities may be included. For example, the apparatus 20B can include a location determining device 24 that operates along with the camera function unit 27 such that as each picture is captured, the image data generated by the camera function unit 27 for the picture is associated with location information generated by the location determining device 24 indicating the geographical location associated with the picture, and the combination of image data and location information is stored as picture data.

Figure 3B:
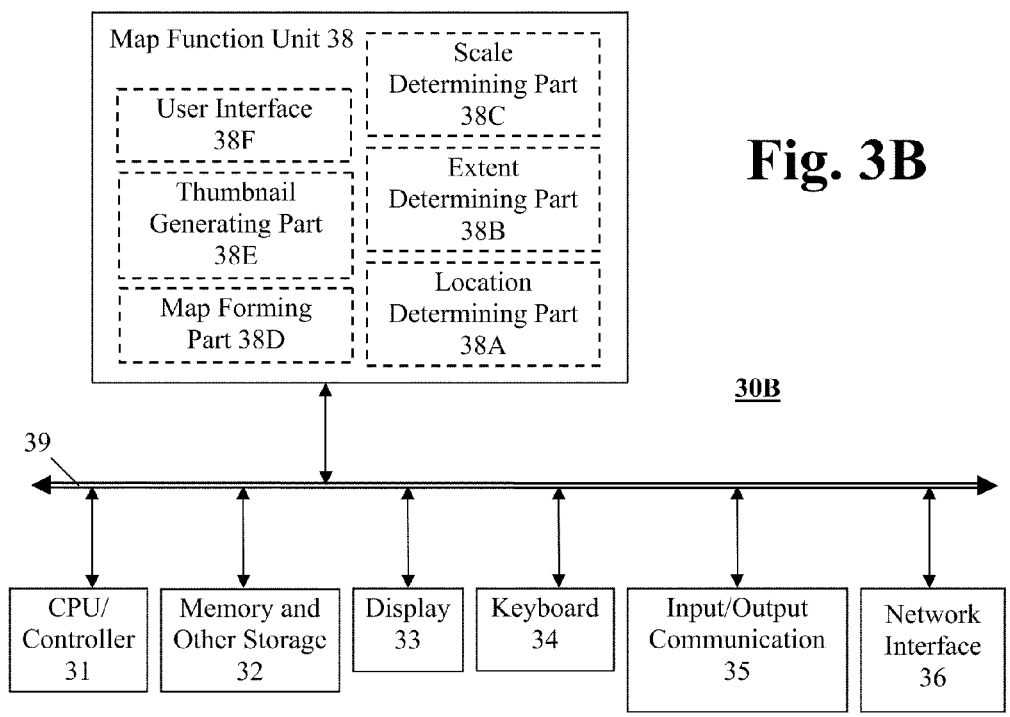
FIG. 3B shows a block diagram of an example of a workstation configured to determine an appropriate map display, such as in a GIS function or another function that includes providing a map display, according to another exemplary embodiment.

The workstation 15B can be configured as shown in FIG. 3B. Computing apparatus 30B shown in FIG. 3B has many of the same components (CPU or controller 31, memory and other storage 32, display 33, keyboard 34, input/output 35, network interface 36) as computing device 30A shown in FIG. 3A. On the other hand, the apparatus 30B includes in addition, a map function unit 38 comprising a location determining part 38A, an extent determining part 38B a scale determining part 38C, a map forming part 38D, a thumbnail generating part 38E and a user interface 38F (similar to the location determining part 28A, extent determining part 28B, scale determining part 28C, map forming part 28D, thumbnail generating part 28E and user interface 28F, respectively, of the map function unit 28 shown in FIG. 2A).

The workstation 15B shown in FIG. 1B may be configured to be application-specific and to include specific application software, although it may utilize a conventional or generally-available platform (for example, Windows, Linux, Mac, etc.) or a proprietary platform. In a specific example, the workstation 15B may be configured as a GIS (geographical information system) station. In such example, the workstation may be configured with enhanced (but conventional) graphics processing (or rendering) capabilities.

As shown in FIG. 1B, the map data 18 may be stored external to the workstation, such as, for example, in an external hard drive or RAID (redundant array of independent disks) array. On the other hand, the workstation itself may be configured with enhanced internal storage capabilities.

Figure 1C:
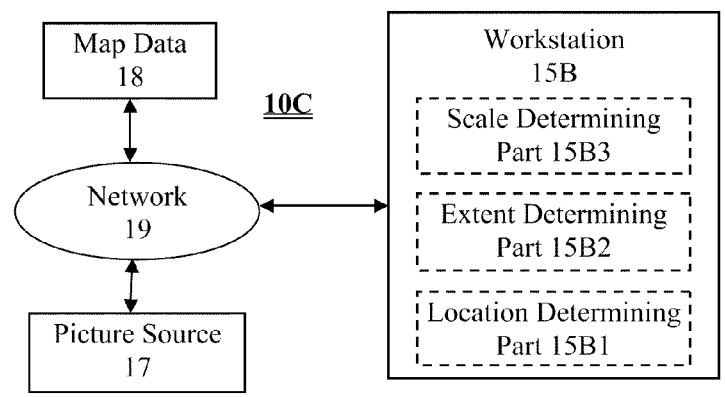
FIG. 1C shows a block diagram of a networked system, in accordance with another exemplary embodiment.

In another example, workstation 15B in system 10C, as shown in FIG. 1C, downloads pictures from a picture source 17 (such as a data store and/or a server) through network 19 and retrieves map data through network 19 from a data store or database (or web application server) 18.

Many other embodiments are possible. For example, an application, including any combination of a location determining part, an extent determining part, a scale determining part, a map forming part, a thumbnail generating part, etc. can be supplied by an application server as software-as-a-service (SaaS) on demand to a requesting device, such as a terminal, connected to a network (such as shown in each of FIGS. 1D through 1G). SaaS is currently a popular software delivery approach wherein enterprises and users obtain access, over the Internet, to applications and related services that would otherwise have to be located on their own personal or enterprise computers.

Figure 1D:
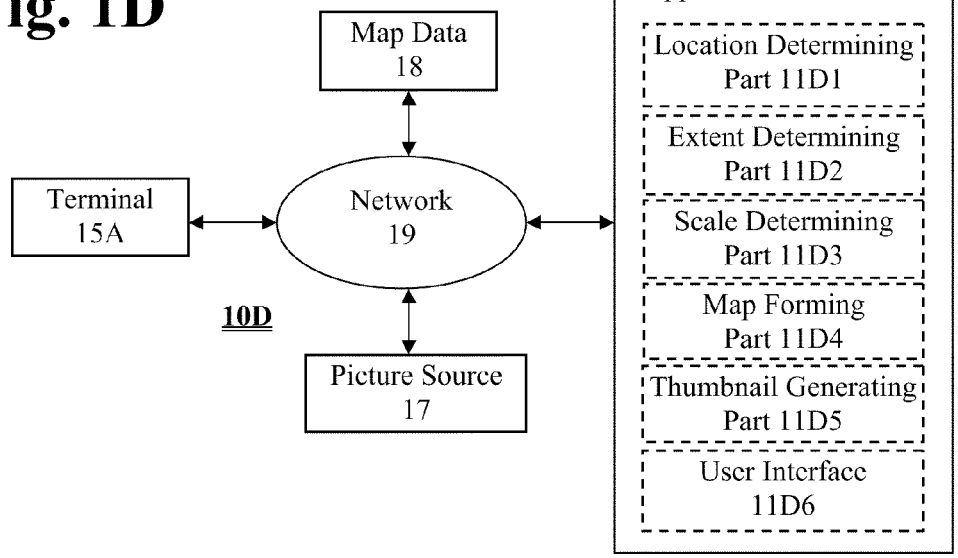
FIG. 1D through 1G show block diagrams of systems, each of which includes an application server, for determining an appropriate map display, in accordance with other exemplary embodiments.

In the embodiment shown in FIG. 1D, the terminal 15A (for example, configured as shown in FIG. 3A), upon request, receives from the application server (and/or web server) 11D an application including in addition to other software parts, a location determining part 11D1, an extent determining part 11D2, a scale determining part 11D3, a map forming part 11D4, a thumbnail generating part 11D5 and a user interface 11D6 (similar to location determining part 38A, extent determining part 38B, scale determining part 38C, map forming part 38D, thumbnail generating part 38E and user interface 38F, respectively), and downloads pictures from a picture source (such as server) 17 through network 19 and retrieves map data through network 19 from a data store or database (or web application server) 18. For example, the user interface 11D6 may enable the user to select the picture source from which pictures are to be downloaded and/or specific pictures to be downloaded from the picture source or to be processed after they have been downloaded. Further, the user interface 11D6 may enable the user to specify a specific map data store or database.

The application server 11D may also be a web server that can be accessed by a user utilizing a web browser (for example, Internet Explorer, Firefox, Chrome, Safari, Opera, etc.). For example, the server 11D may provide a photo-sharing service and in connection therewith the user can download a photo-sharing application (including in addition to photo-sharing functionalities, any combination of a location determining part, an extent determining part, a scale determining part, a map forming part, a thumbnail generating part, etc.) from the server 11D. As another example, the server 11D may provide a GIS service and in connection therewith the user can download a GIS application including in addition to GIS-specific functionalities, any combination of a location determining part, an extent determining part, a scale determining part, a map forming part, a thumbnail generating part, etc.

Figure 4:
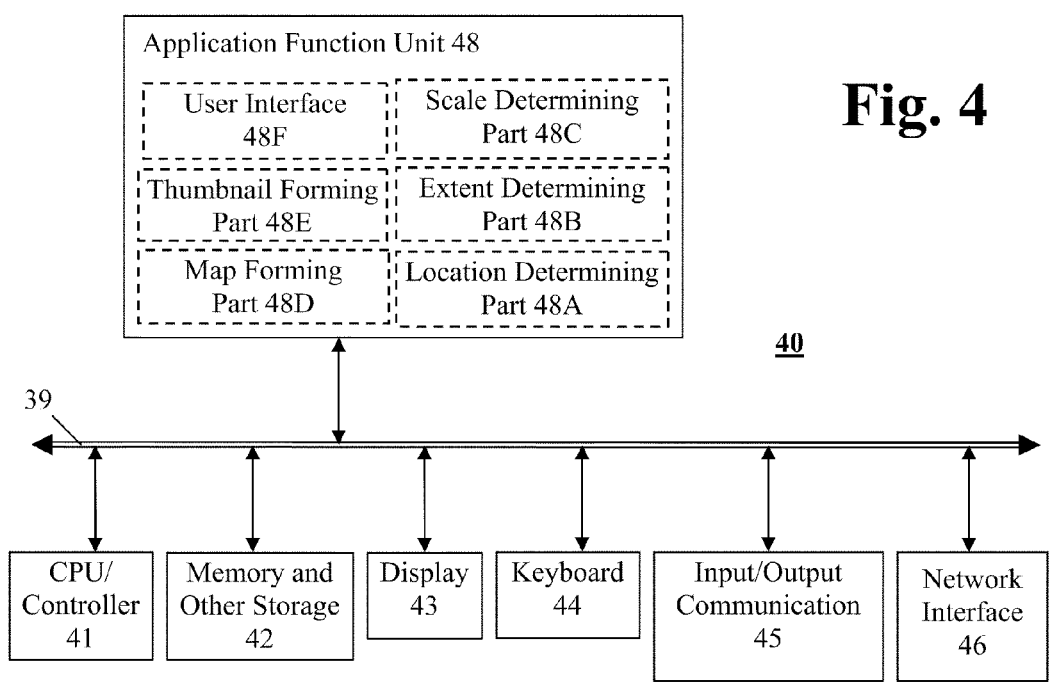
FIG. 4 shows a block diagram of an example of a computing apparatus configured to provide an application as a service including functionality to provide an appropriate map display.

FIG. 4 shows an exemplary constitution of various components of a computing device 40 that can be configured through software as the application server 11D. As shown in FIG. 4, server 11D includes a controller or central processing unit (CPU) 41 that communicates with a number of other components, including memory or storage device(s) 42, display 43, keyboard 44, input/output communications parts 45 and network interface 46, by way of a system bus 49.

The server 40 may be a special-purpose device (such as including one or more application specific integrated circuits or an appropriate network of conventional component circuits) or it may be software-configured on a conventional personal computer or computer workstation with sufficient memory, processing and communication capabilities to operate as a server.

In server 40, controller 41, memory/storage 42, display 43, keyboard 44, input/output communications parts 45 and network interface 46 (like CPU or controller 31, memory and other storage 32, display 33, keyboard 34, input/output 35 and network interface 36, respectively, in workstation 30B) are conventional.

The CPU or controller 41 executing program code instructions controls server operations, including an application function unit 38. The application function unit 38 includes in addition to other software parts, location determining part 48A, extent determining part 48B, scale determining part 48C, map forming part 48D, thumbnail generating part 48E and user interface 48F (which are similar in function to location determining part 38A, extent determining part 38B, scale determining part 38C, map forming part 38D, thumbnail generating part 38E and user interface 38F, respectively, in apparatus 30B shown in FIG. 3B). The various parts can be configured to be packaged as an application to be provided through a network to a requesting terminal. Such packaging and delivery of an application is conventional, and therefore is not discussed in detail herein.

In the system 10D shown in FIG. 1D, the map data source 18 and the picture source 17 are accessed by the terminal 15A or by the application server 11D through the network 19. However, it should be appreciated that need not be network-connected devices and that the system need not be configured to require access to each through the network.

Figure 1E:
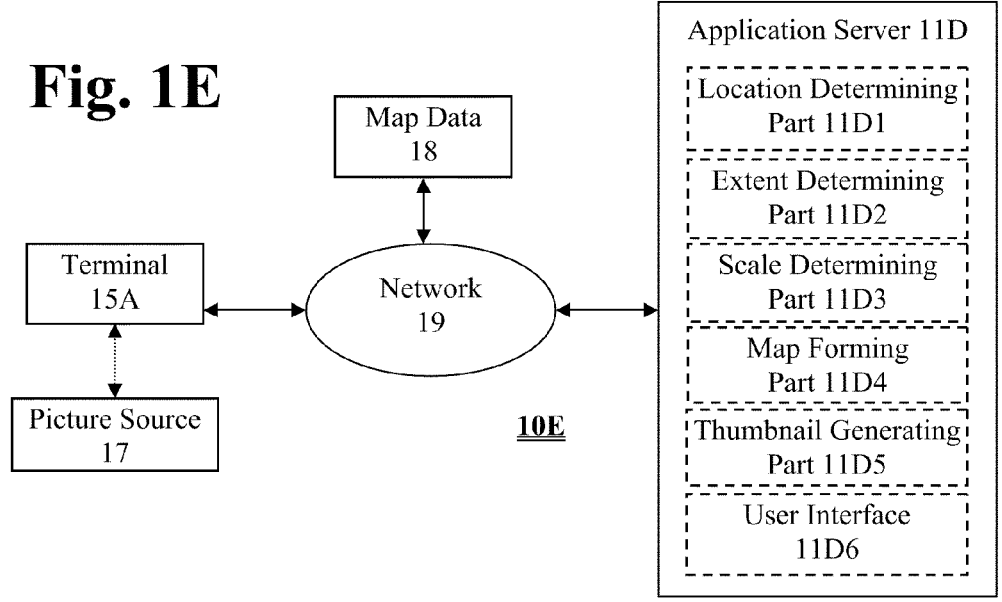

FIG. 1E shows an example in which, as may often be the case, the picture source is connected to the terminal through an input/output port (for example, USB port) or is a storage medium within or external to the terminal (for example, external hard drive, optical disk drive, memory card, other storage media such as CompactFlash, Secure Digital, xD Picture, Memory Stick, MicroDrive, SmartMedia, etc.).

In another example (FIG. 1F), application server 11D provides to terminal 15A an application that includes providing the relevant map data. The application server 11D may retrieve the relevant map data from a directly connected database or data store (FIG. 1F) or a network-connected storage device (FIG. 1E). In any event, the application received from the application server 11D enables the terminal to request map data that is appropriate for selected pictures, receive such map data, and provide an appropriately scaled map display on a native (integrated or connected) display of the terminal. While it will be desirable in most instances to render the map display the map display at a time proximate to when the map data is received, the map forming part may include functionality to allow the user to specify that the received data should be saved for future rendering. Further, the terminal 15A having received the application may maintain a client-side map data store (not shown) and obtain periodically (or upon demand) data updates from the application server 11D or directly from the map data source 18.

Figure 1F:
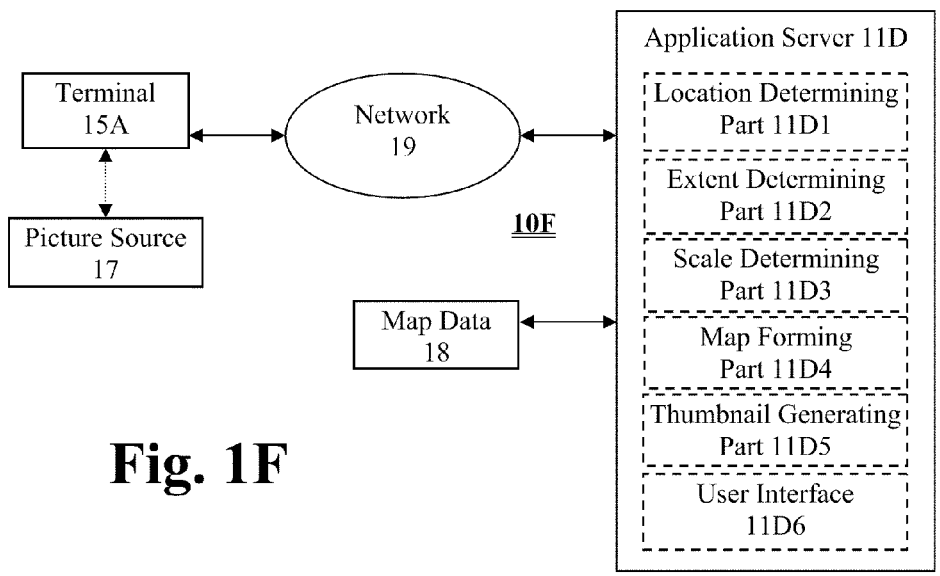
Figure 1G:
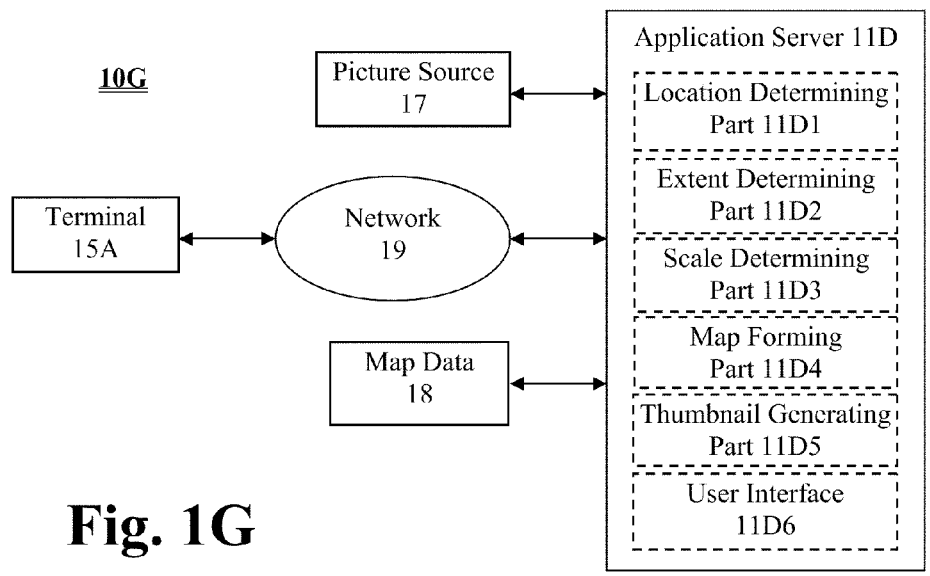

While the terminal 15A in the systems shown in FIGS. 1D through 1F, for the purpose of discussion, is described as receiving the application from the application server 11D, it should be understood that the terminal 15A can be configured with a thin client, particular when the terminal 15A has limited processing and storage resources available. Accordingly, for example, as shown in FIG. 1G, the map data store 18 and picture source 17 may be maintained on the server side. As is typically the case when a thin client is employed, processing is performed as much as possible on the server side and only the needed data is communicated to the client side.

A typical workflow, such as in the systems shown in FIGS. 1A and 1B, will now be discussed with reference to FIGS. 5A-9B.

In the system 10A shown in FIG. 1B, the digital camera can be used to capture pictures. A data dictionary (not shown) can be loaded into the camera from a workstation or other computing device, so that a user of the camera in the field can select workflow-related information from an on-screen menu (or other user interface) system. As may be apparent, the data dictionary loaded in the camera to cause the data entry screen shown in FIG. 5A to be displayed is specific to the insurance industry. In such context, records typically include information such as policy number, claim number, asset type, agent identification number ("ID #"), etc. The list of such pre-set items can be extensive and in the example of FIG. 1A, can be navigated by use of a vertical scroll bar. A selected item can be set by the user to a desired value by utilizing a drop-down list or by manual operation of a keypad on the camera. In addition, voice entry of information through a microphone onboard the camera can be attached as a memo.

Figure 5A:
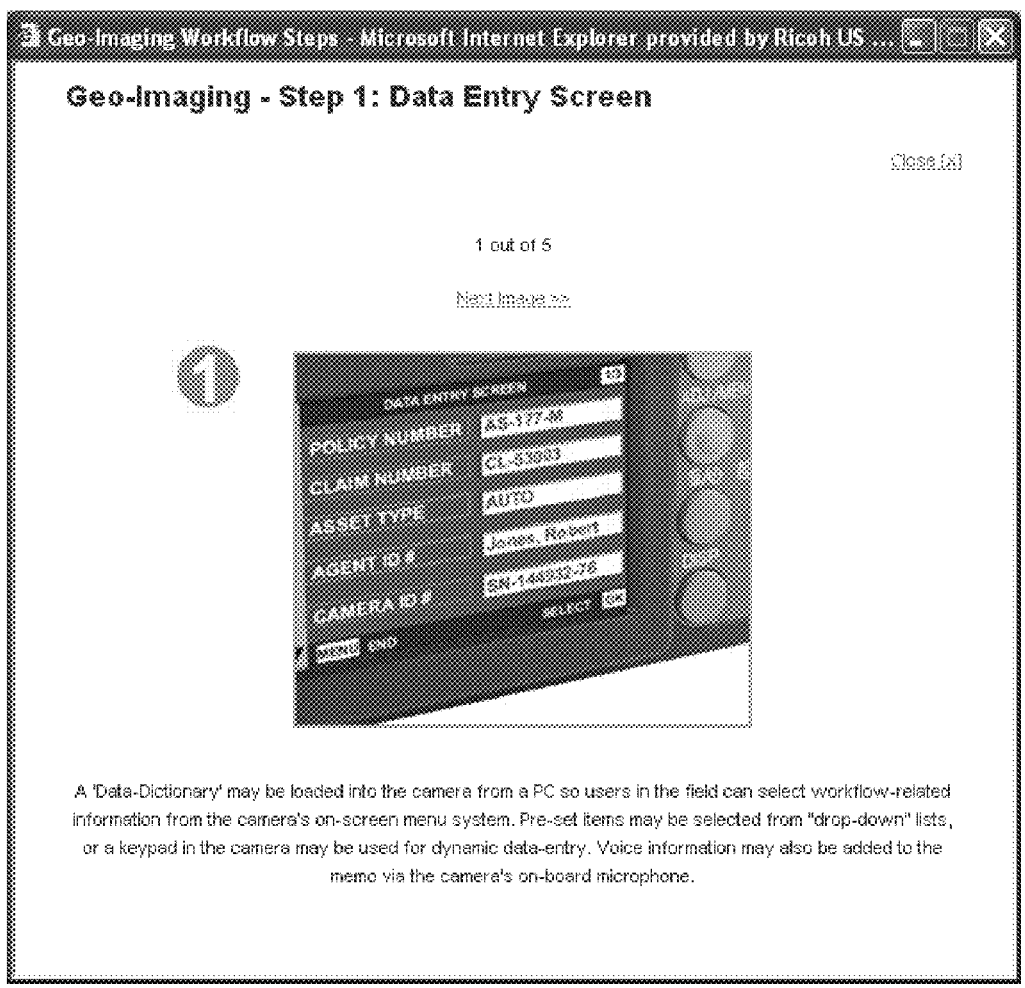
FIGS. 5A through 5E show examples of user interface features in a typical workflow in the systems of FIGS. 1A and 1B.
Figure 5B:
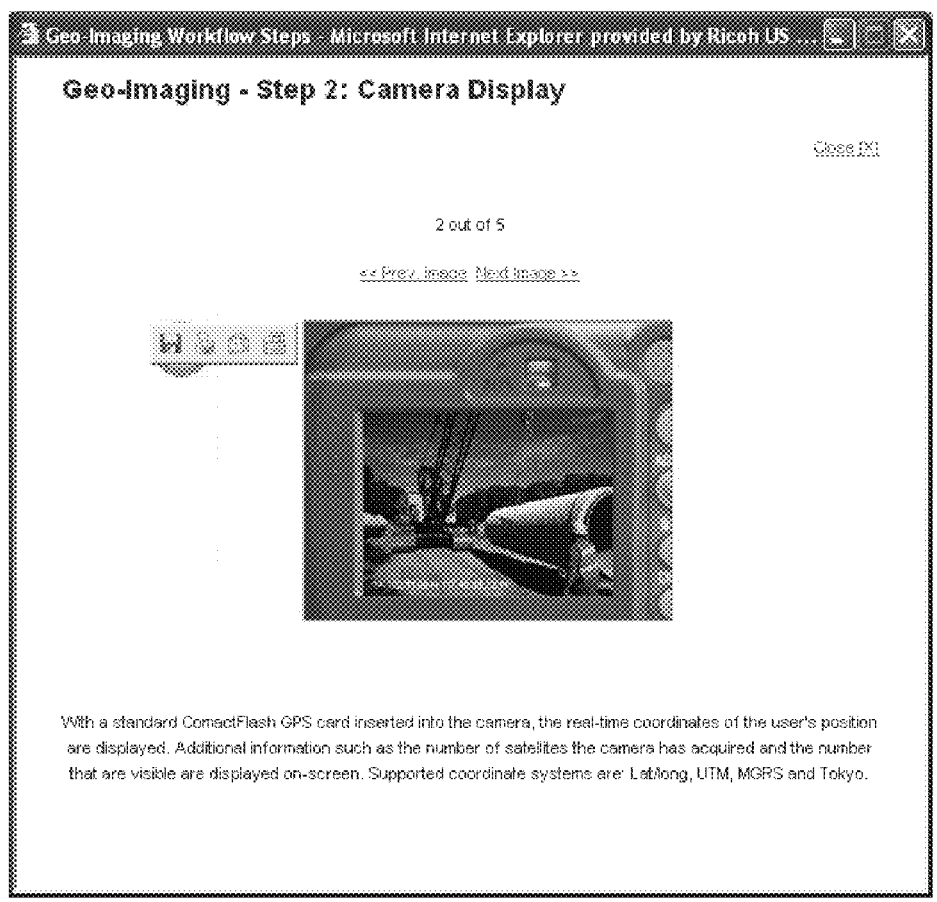

When the camera is in operation (for example, powered on, in view mode or capture mode, etc.) and the location determining device is supplying location information, various information supplied by the location determining device can be displayed on-screen in real time. In the example of FIG. 5B, a GPS card has been inserted in a CompactFlash slot of the camera, and real-time coordinates of the user's (i.e. camera's) position are displayed on-screen. The GPS receiver can supply coordinates in any of various coordinate systems, such as Lat/Long (latitude/longitude), UTM (Universal Transverse Mercator), MGRS (Military Grid Reference System), UPS (Universal Polar Stereographic), USNG (United States National Grid), Tokyo, etc. Additional information such as the number of satellites from which the GPS receiver has acquired signals and the number of satellites that are visible can also be displayed on-screen.

Figure 5C:
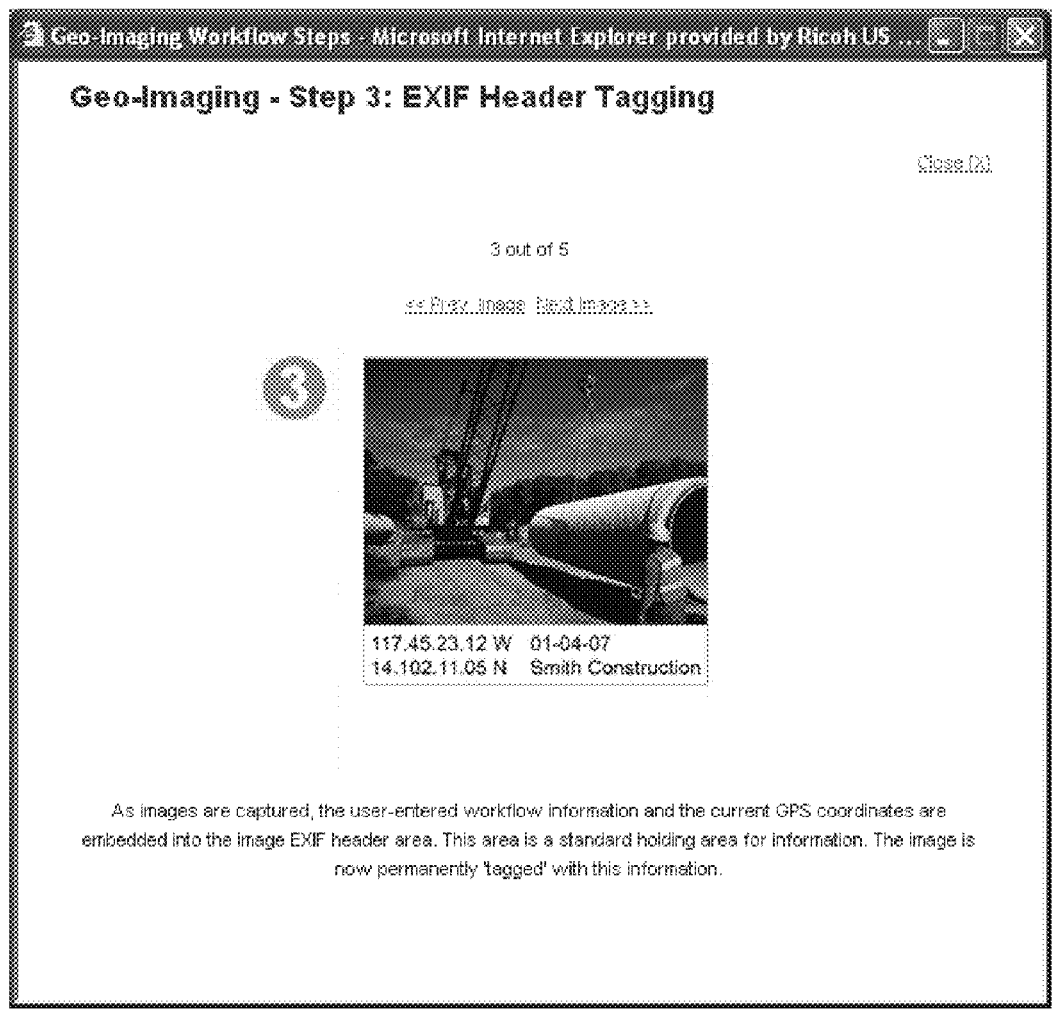

When a picture is captured utilizing the camera, user-entered work-flow information and the GPS coordinates at the time of capture are embedded in the picture data (for example in an EXIF header area) along with the captured image data. Thus, the picture is tagged with the location information. A notional representation of the picture data including the image data plus the metadata (that is, user-entered work-flow information and the GPS coordinates) is shown in FIG. 5C.

Figure 5D:
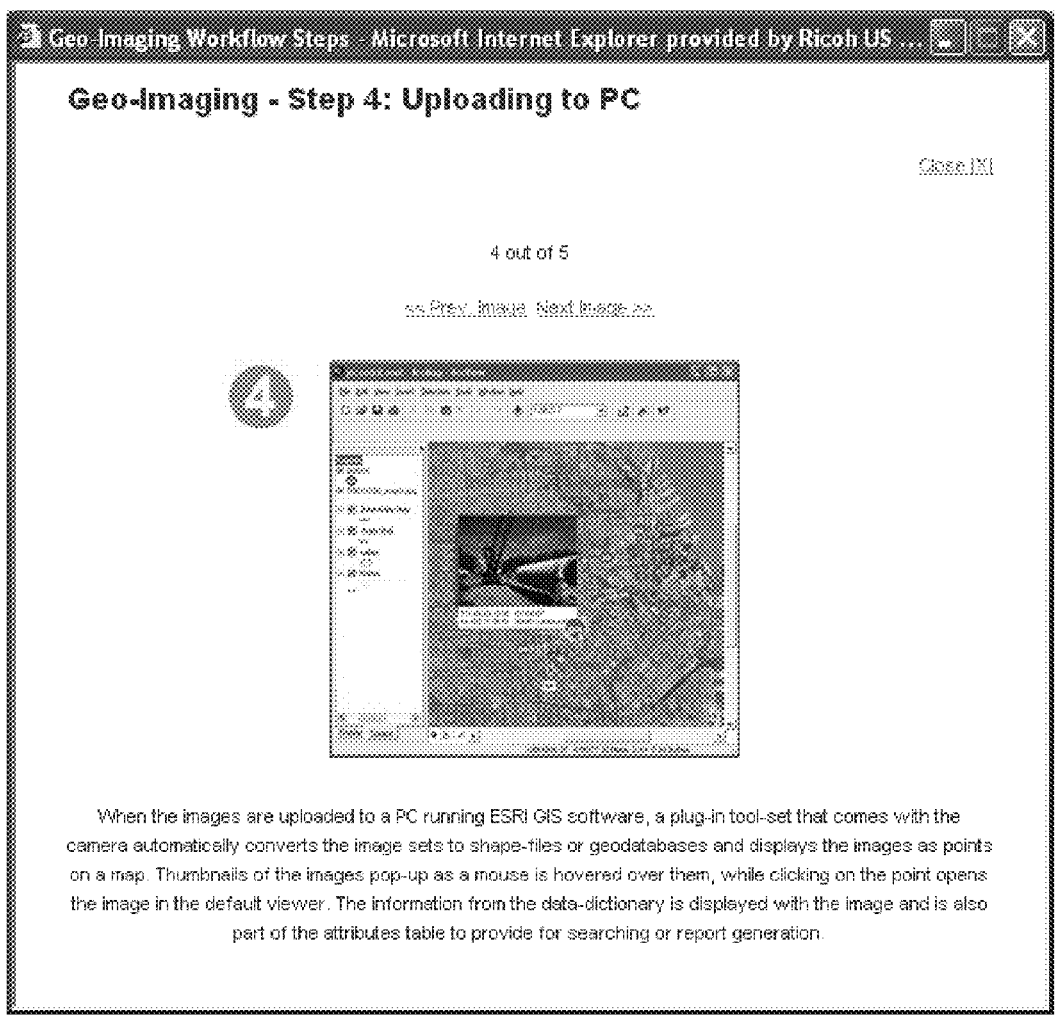
Figure 5E:
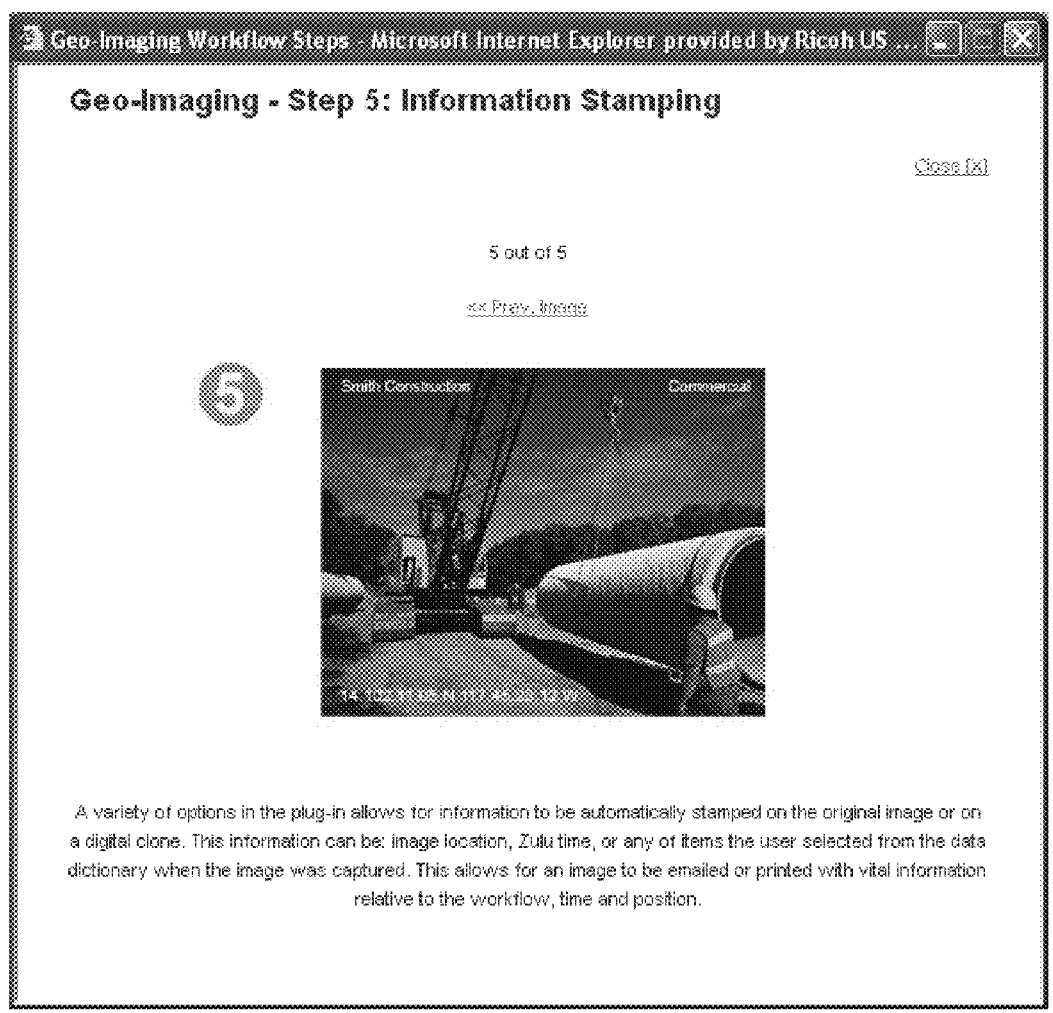

When the camera communicates at a later time with a workstation running GIS software to upload the picture data, a plug-in tool set is communicated along with the picture data from the camera to the workstation. The tool set automatically converts a set of selected pictures to a geodatabase (or an ESRI shapefile when the workstation is running ESRI GIS software), and causes a map to be displayed, on a display unit of the workstation, with the selected pictures as points on the displayed map. When a user operates a pointing device of the workstation to move the cursor to hover over the point associated with one of the pictures, a thumbnail of the picture is superposed as a pop-up, as shown in FIG. 5D. As shown in FIG. 5D, the information from the data dictionary can be displayed along with the thumbnail. By clicking on the point or on the thumbnail, the picture is opened in a default picture viewer.

When the set of selected pictures is communicated to the workstation, an attribute table (as shown in FIG. 6B) is generated for the set of pictures. The attribute table information includes the information included in a listing of pictures (for example, FIG. 6A), as well as additional information specified by the data-dictionary. FIG. 6B shows an example wherein only the Longitude, Latitude coordinates, along with conventional picture file parameters (such as file name, size, type, date modified, date picture taken, dimensions) are maintained in the table. However, other data-dictionary items can be maintained in the attribute table as well.

The plug-in tool set can provided various options to the user, such as to select the data-dictionary items to be maintained in the attribute table (and thus accessible in the GIS). In addition, the options may include allowing the user to specify specific information items (for example, location, date and time picture taken, other data dictionary items, etc.) to be automatically stamped on the picture (original image or digital clone). Thus, pictures can be viewed, emailed, printed, etc., with superposed information representing, workflow, time, position, etc.

The listing of pictures, such as shown exemplarily in FIG. 6A, allows the user to select pictures of interest, and the tool set may be configured to cause the map display to be generated based on the user selection of pictures. Such listing of pictures may be provided by the user interface on the camera apparatus, or by the user interface on the terminal or workstation. The tool set, by default, will cause the map display to be generated automatically based on all of the uploaded pictures, when the pictures are first uploaded. However, map generation functionality of the tool set can preferably be triggered by the user at a later time (for example, after the uploaded pictures have been stored, and even after the camera is no longer connected) through the user interface, such as by user selection of selected pictures.

A method for providing an appropriate map display, according to an exemplary embodiment of this disclosure, will now be discussed with reference to FIGS. 7-9.

When selection of a set of information items, such as pictures, associated with locations, is received (step S71), the extent of latitudes (for example, the mathematical difference between the smallest latitude and the largest latitude amongst the locations of the specific pictures) and extent of longitudes (for example, the mathematical difference between the smallest longitude and the largest longitude amongst the locations of the pictures) covered by the selected pictures are determined (step S72). Such extent of latitudes and extent of longitudes are utilized to determine a scaling factor for the map display, and are utilized to determine the map data to be retrieved (step S73). The map display is displayed with indications of the pictures and scaled according to the scaling factor (step S74).

Figure 8A:
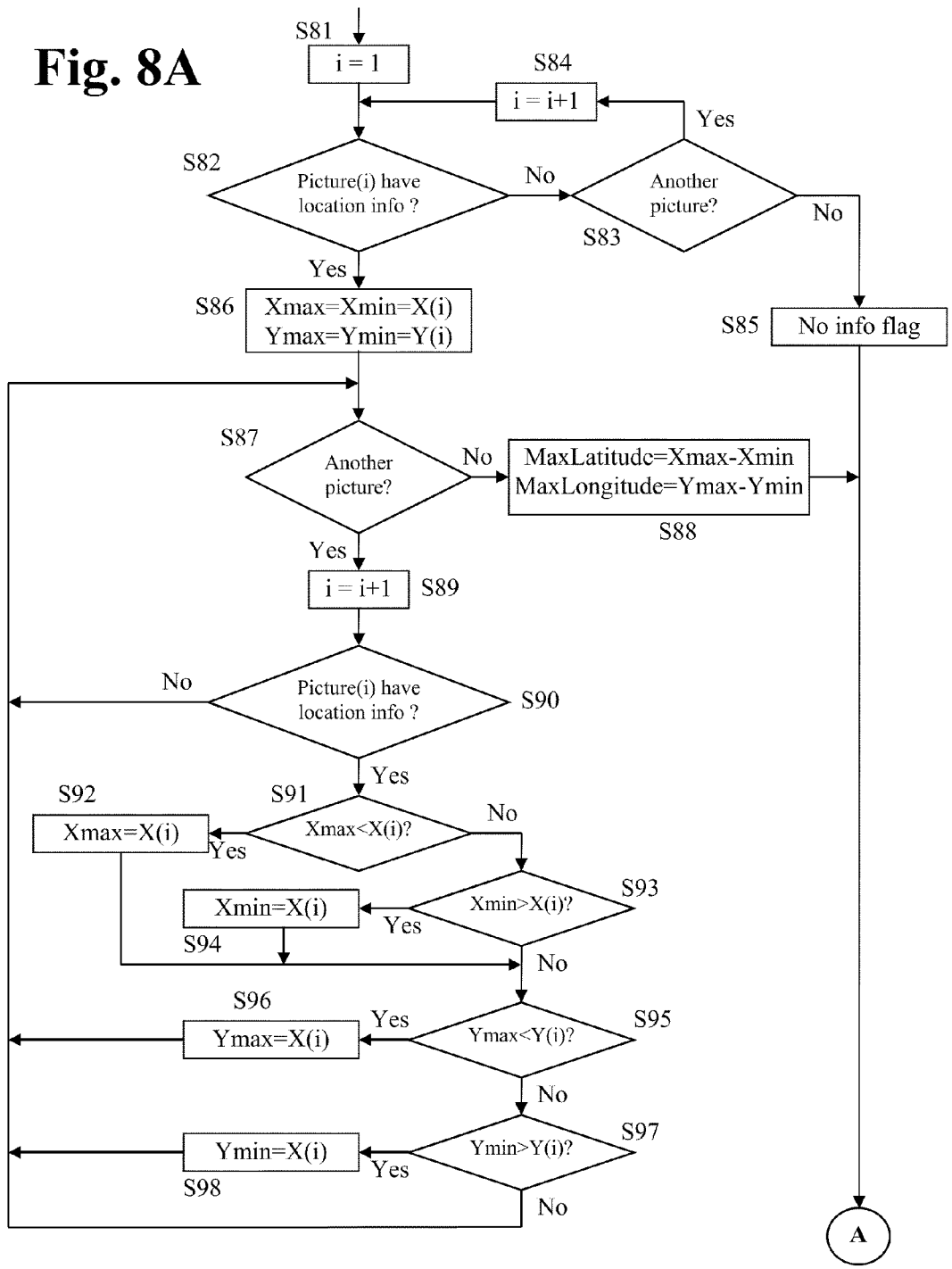
FIGS. 8A and 8B show a flow chart for an example of a process for determining an appropriate scaling factor in the method of FIG. 7.
Figure 8B:
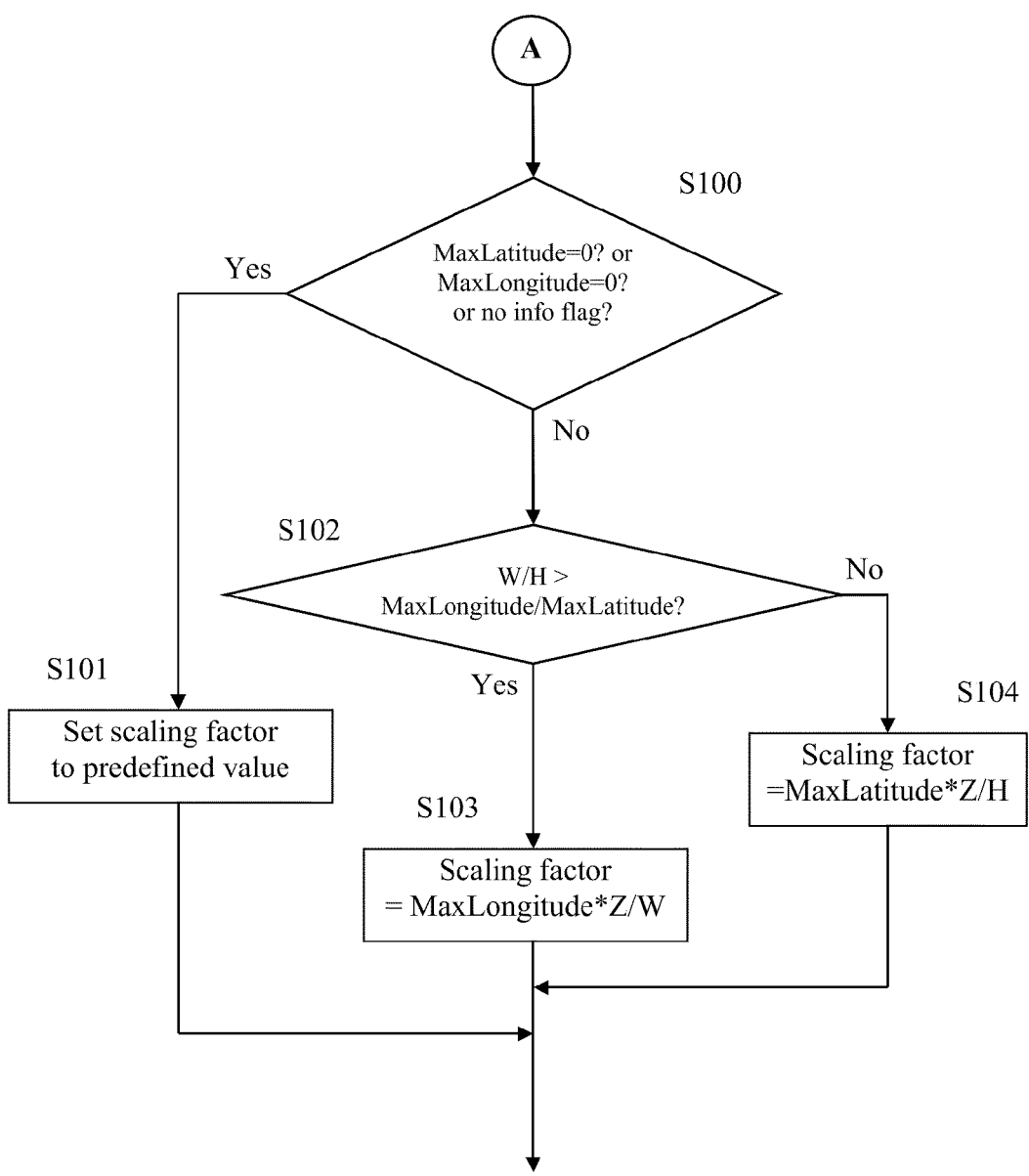

A process for determining the extent of latitudes, the extent of longitudes and an appropriate scaling factor will now be discussed in more detail with reference to FIGS. 8A and 8B. The locations of the selected pictures are considered in turn and a picture index (i) is initially set to 1 (step S81). It is determined whether the first picture has associated location information (step S82). If the picture does not have associated location information (step S82, No), it is determined whether there is another picture (step S83). If there is not another picture (step S83, No), a flag is set indicating that no location information is provided (step S85) and the process proceeds to step S100 (FIG. 8B). If it is determined in step S83 (Yes) that there is another picture, the picture index i is incremented (step S84) and the process returns to step S82 to consider whether the next picture has associated location information.

If it is determined in step S82 (Yes) that the picture under consideration has associated location information, each of the maximum x-value Xmax and the minimum x-value Xmin is set to the x-coordinate (or Longitude) of the location information of the picture under consideration, and each of the maximum y-value Ymax and the minimum y-value Ymin is set to the y-coordinate (or Latitude) of the picture (step S86).

Next, it is determined whether there is another picture (step S87). If there is another picture (step S87, Yes), the picture index i is incremented (step S89) and it is determined whether such next picture has associated location information (step S90). If the picture does not have associated location information (step S90, No), the process returns to step S87 to consider whether there is another picture to process.

On the other hand, if it is determined that the picture under consideration has associated location information (step S82, Yes), the x-coordinate (or Longitude) of the location information of the picture under consideration [X(i)] is compared to the maximum x-value Xmax (step S91) and the minimum x-value Xmin (step S93). If the maximum x-value Xmax is less than the x-coordinate (or Longitude) X(i) [step S91, Yes], the maximum x-value Xmax is changed to X(i) [step S92]. If the minimum x-value Xmin is greater than X(i) [step S93, Yes], the minimum x-value Xmin is changed to X(i) [step S94]. Next, the y-coordinate (or Latitude) of the picture under consideration [Y(i)] is compared to the maximum y-value Ymax (step S95) and the minimum y-value Ymin (step S97). If the maximum y-value Ymax is less than the y-coordinate (or Latitude) Y(i) [step S95, Yes], the maximum y-value Ymax is changed to Y(i) [step S96]. If the minimum y-value Ymin is greater than Y(i) [step S97, Yes], the minimum y-value Ymin is changed to Y(i) [step S98]. Next, the process returns to step S87 to consider whether there is another picture to process.

When it is determined in step S87 (No) there is not another picture to process, the extent MaxLongitude of x-coordinates (or Longitudes) is set to the difference between the minimum x-value Xmin and the maximum x-value Xmax and the extent MaxLatitude of y-coordinates (or Latitudes) is set to the difference between the minimum y-value Ymin and the maximum y-value Ymax (step S88). Next, the process proceeds to step S100 (FIG. 8B).

In step S100, it is determined whether (a) the extent MaxLongitude of x-coordinates (or Longitudes) is zero, or (b) the extent MaxLatitude of y-coordinates (or Latitudes) is zero, or (c) the no location information flag is set. If any of (a), (b) or (c) is true (step S100, Yes), the scaling factor is set to a predefined value (step S101).

If none of (a), (b) or (c) is true (step S100, Yes), it is determined whether the ratio of actual width W of the display to the actual height H of the display is greater than the ratio of MaxLatitude to MaxLongitude (step S102). If the ratio W/H is greater than the ratio MaxLatitude/MaxLongitude (step S102, Yes), the scaling factor is set to the product MaxLongitude*(Z/W), where Z is the actual length of the scale in the display (step S103). If the ratio W/H is not greater than the ratio MaxLatitude/MaxLongitude (step S102, No), the scaling factor is set to the product MaxLatitude*(Z/H) [step S104].

Figure 9:
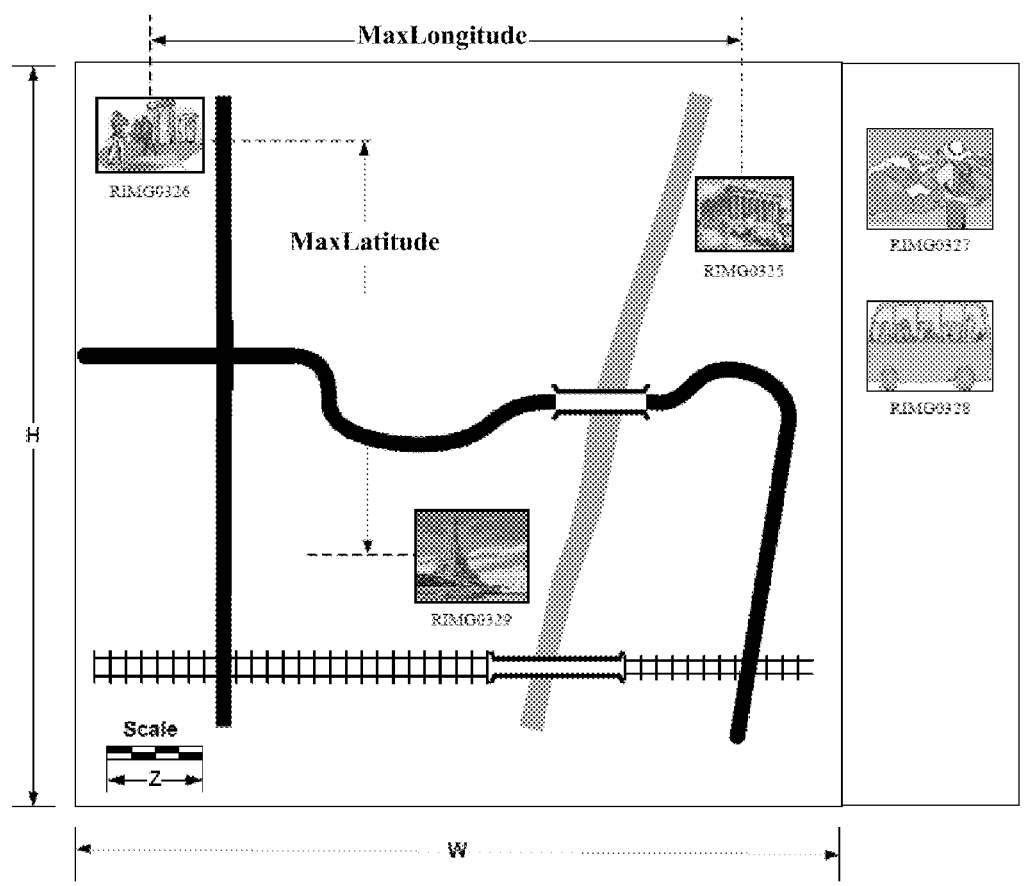
FIG. 9 shows a schematic view of an example of a map display, with annotation, in accordance with an exemplary embodiment.

FIG. 9 shows a schematic view of a map display with annotation of W, H, Z, extent MaxLatitude and extent MaxLongitude, for the example of FIG. 6B. Thumbnails for pictures having associated location information are superposed on the map display. In the example of FIG. 6, some of the pictures (RIMG0327, RIMG0328) have no associated location information. Nevertheless, thumbnails for such pictures (RIMG0327, RIMG0328) are provided to the side of the map, to allow the user have some visual sense of the pictures and allow the user to open such pictures in a viewer.

The above specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

In addition, while the examples refer to pictures such as photographs obtained from digital cameras or electronic devices having a camera function, such pictures can be, or include, graphics and other visual images. The location for such other types of pictures may be entered through the user interface.

Further, while GIS and photo-sharing applications are referenced herein as examples, it should be appreciated that the subject matter of this disclosure can be applied to any application that involves a plurality of information items with each item having an associated geographical location. In instances when information items in connection with our work and other life experiences are, or can be, associated with corresponding location information, an appropriately scaled map display, as provided by the subject matter of this disclosure, provides a useful view or means for visualizing spatial relations amongst the information items (even when such items are not normally pictorial or visual).

What is claimed is:

1. An apparatus configured to determine an appropriate map display, said apparatus comprising:
   a location determining part configured to obtain for each specific one of a plurality of pictures, location information corresponding to a geographical location associated with the specific picture;
   an extent determining part configured to determine an extent of the locations of the specific pictures, based on the location information of the specific pictures; and
   a scale determining part configured to determine a scaling factor based on the extent of the locations determined by the extent determining part, and cause a map image to be scaled according to the scaling factor.

2. The apparatus of claim 1, further comprising:
a thumbnail generating part configured to generate, for each of the pictures, a thumbnail corresponding to a reduced-scale image of the picture;
a communication part configured to obtain, from a map database, map data corresponding to the extent determined by the extent determining part; and
a display part configured to display the map image based on the map data obtained through the communication part, and display the thumbnails superposed on the map image.

3. The apparatus of claim 2, wherein the thumbnails overlaid on the map image are associated with hyperlinks to the respective pictures.

4. The apparatus of claim 1, further comprising:
a thumbnail generating part configured to convert, for each of the pictures having associated location information, the picture to a corresponding thumbnail corresponding to a reduced-scale image of the picture,
wherein the thumbnails are overlaid on the map image to indicate the locations associated with the respective pictures.

5. The apparatus of claim 1, further comprising:
a communication part configured to transmit an application including the location determining part, the extent determining part and the scale determining part, to a terminal via a network, in response to a request from the terminal,
wherein the application causes map data to be retrieved from a map database, the retrieved map data corresponding to the extent determined by the extent determining part.

6. The apparatus of claim 5, wherein the application causes the map image based on the retrieved map data to be displayed on a display of the terminal, and thumbnails overlaid on the map image are associated with respective points on the map image to indicate the locations corresponding to the respective pictures and are associated with hyperlinks to the respective pictures.

7. The apparatus of claim 1, further comprising:
a digital camera function unit configured to capture an image for one or more of the plurality of pictures,
wherein at a time a specific image is captured by the digital camera function unit, the location determining part receives location information from a location determination device, and the specific picture is tagged with the location information.

8. The apparatus of claim 7, wherein the location information is included as metadata to tag the specific picture with the location information.

9. The apparatus of claim 1, further comprising:
a digital camera function unit configured to capture an image for one or more of the plurality of pictures,
wherein at a time a specific image is captured by the digital camera function unit, the location determining part obtains location information indicating a geographical location of the digital camera function unit, and
the location information associated with the specific image is stored in an Exif portion of the picture.

10. The apparatus of claim 1, further comprising:
a map data storage part configured to store data for a map, receive a request for data corresponding to the extent determined by the extent determining part, and output the requested map data; and
a display part configured to display a map image based on the map data from the map data storage part, the map image being scaled according to the scaling factor determined by the scale determining part.

11. The apparatus of claim 1, further comprising:
a communication part configured to obtain picture data for the plurality of pictures from another device, said picture data including metadata,
wherein for said each specific one of the pictures, said location determining part obtains the location information from the metadata for the specific picture.

12. The apparatus of claim 1, further comprising:
a communication part configured to communicate picture data for the plurality of pictures and map data for the map image to a terminal via a network, to cause a map image to be displayed on a display of the terminal, in response to a request from the terminal.

13. The apparatus of claim 1, wherein the location information associated with the specific picture includes an x-coordinate and a y-coordinate associated with the specific picture, and wherein the extent determining part determines at least the following:
an extent of x-coordinates covered by the specific pictures;
an extent of y-coordinates covered by the specific pictures;
a first ratio of the extent of x-coordinates to the extent of y-coordinates;
a second ratio of an actual width W of the display of the map to an actual height H of the display of the map; and
wherein the scale determining part
(i) sets the scaling factor to a product of the extent of x-coordinates and a third ratio of an actual length Z of a scale in the map to the actual width W of the display of the map, if the second ratio is greater than the first ratio, and
(ii) sets the scaling factor to a product of the extent of y-coordinates and a fourth ratio of the actual length Z of the scale in the map to the actual height H of the display of the map, if the second ratio is smaller than the first ratio.

14. The apparatus of claim 1, wherein the location information associated with the specific picture includes a specific longitude and a specific latitude associated with the specific picture, and wherein the extent determining part determines at least the following:
an extent of longitudes covered by the specific pictures;
an extent of latitudes covered by the specific pictures;
a first ratio of the extent of longitudes to the extent of latitudes;
a second ratio of an actual width W of the display of the map to an actual height H of the display of the map; and
wherein the scale determining part
(i) sets the scaling factor to a product of the extent of longitudes and a third ratio of an actual length Z of a scale in the map to the actual width W of the display of the map, if the second ratio is greater than the first ratio, and
(ii) sets the scaling factor to a product of the extent of latitudes and a fourth ratio of the actual length Z of the scale in the map to the actual height H of the display of the map, if the second ratio is smaller than the first ratio.

15. A system for providing an appropriate map display, said system comprising:
a picture storage device configured to store a plurality of pictures and for each specific picture, location information corresponding to a geographical location associated with the specific picture;
a picture selection part configured for selection of specified ones of the plurality of pictures;

a map database configured to store data for a map;

a map retrieval part configured to determine an extent based on the location information of the selected pictures, and retrieve map data from the map database, the retrieved map data corresponding to the extent determined based on the location information of the selected pictures; and a map display device configured to display a map image based on the retrieved map data and scaled according to a scaling factor determined based on the extent, and overlay thumbnails associated with respective points on the map image to indicate the locations corresponding to the selected pictures.

16. The system of claim 15, further comprising:

a map source device including the map database; and a terminal including
   the map display device,
   the map retrieval part and
   a network communication part configured to communicate a request from the map retrieval part through a network to the map source device, and receive from the map source device the map data for the map image to be displayed on the map display device, in response to the request from the map retrieval part.

17. The system of claim 15, further comprising:

a map source device configured to transmit a map application through a network to a requesting device; and a terminal including the map display device and a network communication part configured to communicate through the network to receive the map application from the map source device,
   the map application executing on the terminal allowing the terminal to obtain the map data retrieved by the map retrieval part from the map database through the network.

18. The system of claim 15, further comprising:

a map source device including the map database and the map retrieval part; and a terminal including
   the map display device and
   a network communication part configured to communicate a request through a network to the map source device, and receive from the map source device the map data for the map image to be displayed on the map display device, in response to the request.

19. A method for providing an appropriate map display, comprising:
   (a) obtaining for each of a plurality of selected pictures, location information indicating a corresponding geographical location associated with the selected picture;
   (b) determining an extent of the locations of the selected pictures, based on the location information of the selected pictures;
   (c) determining by an image processing device a scaling factor based on the extent of the locations determined in (b); and
   (d) displaying a map image with indications of the locations associated with the selected pictures, and utilizing the scaling factor determined in by the image processing device in (c) to scale the displayed map.

20. The method of claim 19, wherein the indications on the map image indicating the locations corresponding to the respective pictures include thumbnails corresponding to reduced-scale images of the respective picture.

* * * * *